US012189669B2

United States Patent
Sharma et al.

(10) Patent No.: US 12,189,669 B2
(45) Date of Patent: Jan. 7, 2025

(54) EXTRACTING QUERY-RELATED TEMPORAL INFORMATION FROM UNSTRUCTURED TEXT DOCUMENTS

(71) Applicant: International Business Machines Corporation, Armonk, NY (US)

(72) Inventors: Udit Sharma, Gurgaon (IN); Hima Prasad Karanam, Bangalore (IN); Shajith Ikbal Mohamed, Chennai (IN); Sumit Neelam, Bangalore (IN); Santosh Srivastava, New Delhi (IN); L. Venkata Subramaniam, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 17/543,127

(22) Filed: Dec. 6, 2021

(65) Prior Publication Data
US 2023/0177076 A1    Jun. 8, 2023

(51) Int. Cl.
*G06F 16/33* (2019.01)
*G06F 17/10* (2006.01)

(52) U.S. Cl.
CPC ............ *G06F 16/334* (2019.01); *G06F 17/10* (2013.01)

(58) Field of Classification Search
None
See application file for complete search history.

(56) References Cited

U.S. PATENT DOCUMENTS

| 9,519,686 B2 | 12/2016 | Bufe, III et al. |
| 10,303,798 B2 | 5/2019 | Stubley et al. |
| 2004/0027349 A1* | 2/2004 | Landau .................. G06F 16/26 345/440 |
| 2005/0086226 A1* | 4/2005 | Krachman ............. G06Q 50/16 |

(Continued)

FOREIGN PATENT DOCUMENTS

CN      110727839 A      1/2020

OTHER PUBLICATIONS

Mehrdad Sabetzadeh; An Algebraic Framework for Merging Incomplete and Inconsistent Views;2005;IEEE; pp. 1-10.*

(Continued)

*Primary Examiner* — Albert M Phillips, III
*Assistant Examiner* — Jermaine A Mincey
(74) *Attorney, Agent, or Firm* — Ryan, Mason & Lewis, LLP

(57) ABSTRACT

Methods, systems, and computer program products for extracting query-related temporal information from unstructured text documents are provided herein. A computer-implemented method includes obtaining at least one user query comprising one or more temporal components; converting at least a portion of the at least one user query into one or more logic form representations; mapping at least a portion of the one or more logic form representations to one or more portions of at least one source of unstructured text data; extracting temporal information, specific to the at least one user query, from one or more portions of the at least one source of unstructured text data based on the mapping; generating at least one response to the at least one user query based on the extracted temporal information; and performing one or more automated actions based on the at least one generated response.

20 Claims, 6 Drawing Sheets

(56) References Cited

U.S. PATENT DOCUMENTS

| | | | | |
|---|---|---|---|---|
| 2009/0182636 | A1* | 7/2009 | Gilula | G06Q 30/0269 |
| | | | | 705/26.1 |
| 2011/0264656 | A1* | 10/2011 | Dumais | G06F 16/9537 |
| | | | | 707/765 |
| 2016/0239562 | A1* | 8/2016 | Schilder | G06F 16/3344 |
| 2018/0018331 | A1* | 1/2018 | Kesamreddy | G06F 16/24578 |
| 2018/0025075 | A1 | 1/2018 | Beller et al. | |
| 2018/0232376 | A1 | 8/2018 | Zhu et al. | |
| 2018/0240008 | A1 | 8/2018 | Boxwell et al. | |
| 2018/0359041 | A1* | 12/2018 | Lee | A63F 13/5375 |
| 2020/0034357 | A1 | 1/2020 | Panuganty et al. | |
| 2020/0401593 | A1 | 12/2020 | Panuganty et al. | |
| 2021/0365306 | A1 | 11/2021 | Haldar et al. | |

OTHER PUBLICATIONS

Wu et al., Introducing External Knowledge to Answer Questions with Implicit Temporal Constraints over Knowledge Base, Future Internet, Mar. 5, 2020.

Saxena et al., Question Answering Over Temporal Knowledge Graphs, arXiv.org, Jun. 3, 2021.

Cui et al., KBQA: Learning Question Answering over QA Corpora and Knowledge Bases, 2019.

Ling et al., Temporal Information Extraction, 2010.

Kuzey et al., Extraction of Temporal Facts and Events from Wikipedia, 2011.

Saquete et al., Splitting Complex Temporal Questions for Question Answering Systems, 2004.

Jia et al., TEQUILA: Temporal Question Answering over Knowledge Bases, https://arxiv.org/abs/1908.03650, 2018.

Wu et al., TeMP: Temporal Message Passing for Temporal Knowledge Graph Completion, https://arxiv.org/ abs/2010.03526, 2020.

Li et al., Graph-to-Tree Neural Networks for Learning Structured Input-Output Translation with Applications to Semantic Parsing and Math Word Problem, https://arxiv.org/abs/2004.13781, 2020.

Wu et al., Scalable Zero-Shot Entity Linking with Dense Entity Retrieval, https://arxiv.org/pdf/1911.03814.pdf, 2020.

Mihindukulasooriya et al., Leveraging Semantic Parsing for Relation Linking over Knowledge Bases, https://arxiv.org/pdf/2009.07726.pdf, 2020.

Moschitti et al., Question Answering and Knowledge Graphs, Exploiting Linked Data and Knowledge Graphs in Large Organisations, pp. 181-212, Feb. 3, 2017.

Savenkov et al., When a Knowledge Base is Not Enough: Question Answering over Knowledge Bases with External Text Data, 39th International ACM SIGIR conference, 2016.

\* cited by examiner

EXTRACTING QUERY-RELATED TEMPORAL INFORMATION FROM UNSTRUCTURED TEXT DOCUMENTS

BACKGROUND

The present application generally relates to information technology and, more particularly, to data processing techniques. More specifically, knowledge bases often contain limited temporal information. Typically, temporal information is present inside a text property, or temporal information is present in a source document but not captured in the corresponding knowledge graph. Additionally, date elements for entities present in a knowledge graph can be present without any other context. Accordingly, numerous issues arise as a result of such a lack of temporal information.

SUMMARY

In at least one embodiment, techniques for automatically extracting query-related temporal information from unstructured text documents are provided. An example computer-implemented method includes obtaining at least one user query comprising one or more temporal components, converting at least a portion of the at least one user query into one or more logic form representations, and mapping at least a portion of the one or more logic form representations to one or more portions of at least one source of unstructured text data. The method also includes extracting one or more items of temporal information, specific to the at least one user query, from one or more portions of the at least one source of unstructured text data based at least in part on the mapping, generating at least one response to the at least one user query based at least in part on the one or more extracted items of temporal information, and performing one or more automated actions based at least in part on the at least one generated response.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, at least one embodiment includes extracting query-related temporal information from unstructured text documents. As further detailed herein, such an embodiment can include facilitating and/or implementing temporal question-and-answer (QA) systems on knowledge graphs by extracting temporal clues from text. One or more such embodiments include parsing an input query into an intermediate logic form capturing one or more temporal constraints, extracting one or more temporal clues for the input query using the intermediate logic representation of the input query and at least one related knowledge base, and ranking the extracted temporal clues using contextual information derived from the input query and contextual information surrounding the extracted temporal clues derived from corresponding text data from the knowledge base.

Accordingly, at least one embodiment includes extracting question/query-specific temporal information from unstructured text documents to fill at least one knowledge gap and/or answer the question/query. As further detailed herein, such an embodiment includes converting the question/query into logic form, mapping at least a portion of the logic form into at least one knowledge base, identifying one or more temporal knowledge gaps in the at least one knowledge base, extracting question/query-specific temporal clues from the text contained with the at least one knowledge base, ranking the temporal clues based on contextual information derived from the question/query, and automatically answering the question/query using derived and existing temporal information from the at least one knowledge base based at least in part on the ranking.

Figure 1:
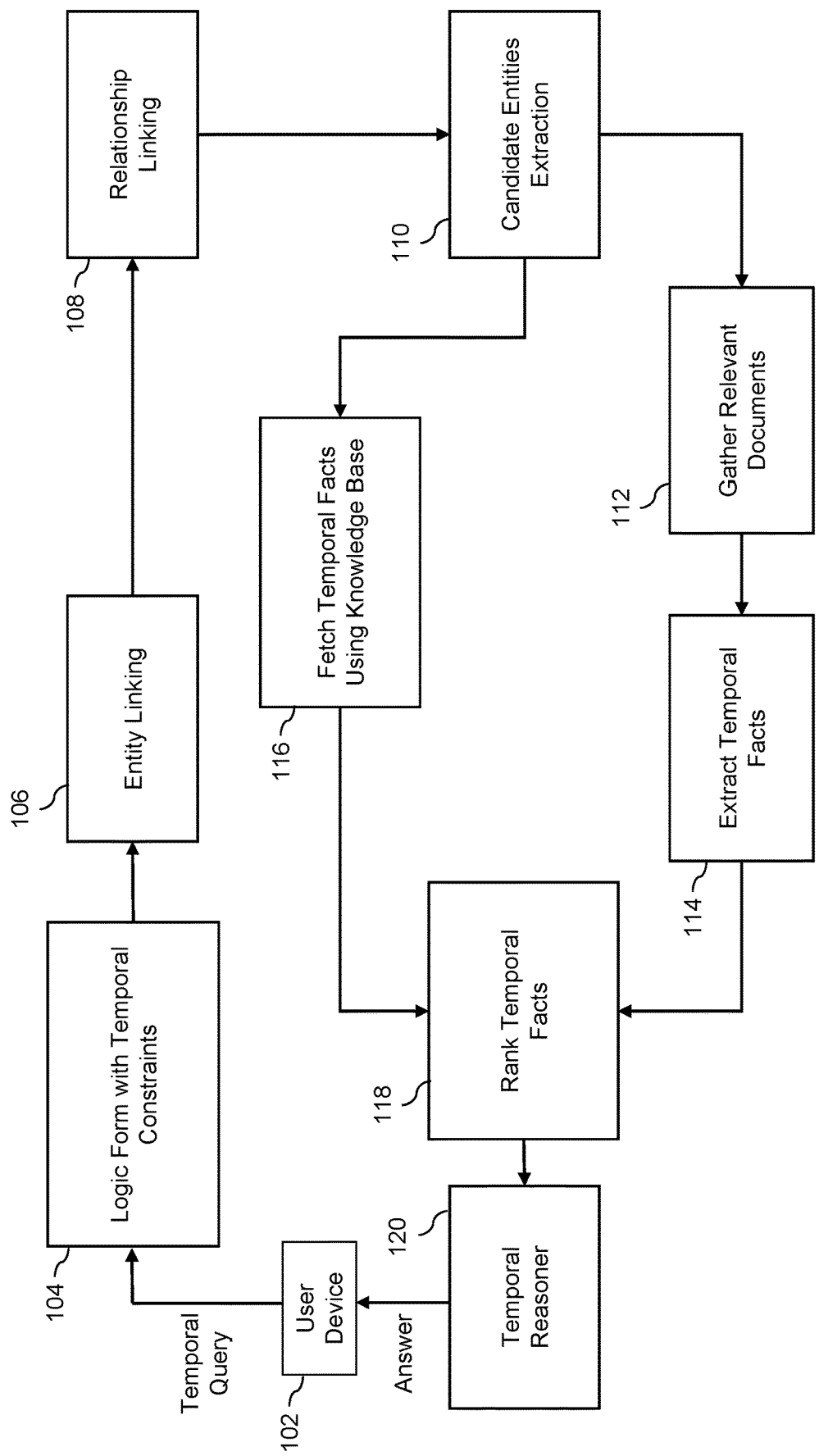
FIG. 1 is a diagram illustrating system architecture, according to an example embodiment of the invention.

FIG. 1 is a diagram illustrating system architecture, according to an embodiment of the invention. By way of illustration, FIG. 1 depicts user device 102, which generates a temporal query, which is converted into logic form with one or more temporal constraints 104. Entity linking is performed on the logic form via component 106, followed by relationship linking via component 108. A goal of entity linking includes linking the entities mentioned in one or more input natural language questions to their equivalent entities in a knowledge base, and such linking can be carried out using one or more entity linking techniques (e.g., BLINK). Additionally, a goal of relationship linking includes linking the relations mentioned in one or more input natural language questions to their equivalent relations in a knowledge base, and such linking can be carried out using one or more relationship linking techniques (e.g., SLING). Based at least in part on these linking operations, candidate entities are extracted from at least one given knowledge base via component 110, and based on such candidate entities, temporal facts and/or information are fetched using the at least one knowledge base via component 116. Such candidate entities can include a set of entities which are candidates for being an answer entity if the temporal constraints are ignored.

Additionally, based at least in part on the extracted candidate entities, relevant documents (e.g., textual documents obtained for each candidate entity such that the document has a mention of the candidate entity) are gathered via component 112, and temporal facts and/or information are extracted from the relevant documents via component 114. The temporal facts and/or information extracted via component 114 and component 116 are then ranked via component 118, and temporal reasoner 120 uses the ranked temporal facts and/or information to determine and generate an answer which is provided to user device 102 in response to the temporal query. By way of example, each entity can have multiple temporal facts associated therewith, and ranking such facts facilitates determination of the most relevant facts according to the question context. The temporal reasoner 120 performs at least one reasoning operation mentioned in the given question on the timeline for each of the candidate entities and one or more other events present in the question to obtain one or more answer entities.

By way of illustration of one or more embodiments (such as, e.g., the embodiment depicted in FIG. 1), consider the following example use case. Upon receiving a user query such as "Was Mahatma Gandhi alive when the Indian constitution came into effect?", question logic generation can include abstract meaning representation (AMR) generation, the output(s) of which can be used to obtain logic representation including temporal intervals such as the following: Interval(i1, live-01("Mahatma Gandhi")ˆInterval (i2, effect-03(constitution(India))ˆoverlap(i1,i2).

In at least one embodiment, converting temporal question text into a logic form with temporal constraints can include obtaining an AMR parse tree for the temporal question, and obtaining at least one knowledge base agnostic logic representation which captures all of the temporal signals present in the question using at least one rule-based transformation. Additionally or alternatively, one or more neural networks (e.g., Graph2Tree) can be implemented for transforming natural language questions into logic form.

One or more embodiments can also include linking the surface form of the entities present in the logic representation to at least one knowledge base-specific entity, as well as linking the surface form of the relationships present in the logic representation to at least one knowledge base-specific predicate. As used in this context, surface forms include a word or a group of words that match one or more lexical units (e.g., from a query). Entity mentions and surface forms can be used interchangeably. Subsequently, in such an embodiment temporal information can be extracted (e.g., temporal information pertaining to the Indian constitution, in the example above) from the at least one knowledge base.

As detailed herein, one or more embodiments also include extracting events and/or temporal clues or information from text (such as, e.g., knowledge base text). By way of example, consider an interval logic form of "Interval(i1, p(e1,e2))." At least one embodiment includes identifying, from the text, all of the candidate entities using the predicates and question entities identified in the intermediate logic. For each candidate entity, such an embodiment includes identifying all of the sentences containing temporal information for a given predicate from the corresponding text data. Also, for each sentence present in the document, such an embodiment includes generating an AMR graph, and if the AMR graph has a :date-entity frame, then the sentence is considered temporal; otherwise, the sentence is not temporal. Subsequently, one or more embodiments include generating temporal facts logic based at least in part on the above-noted AMR graph analysis.

Figure 2:
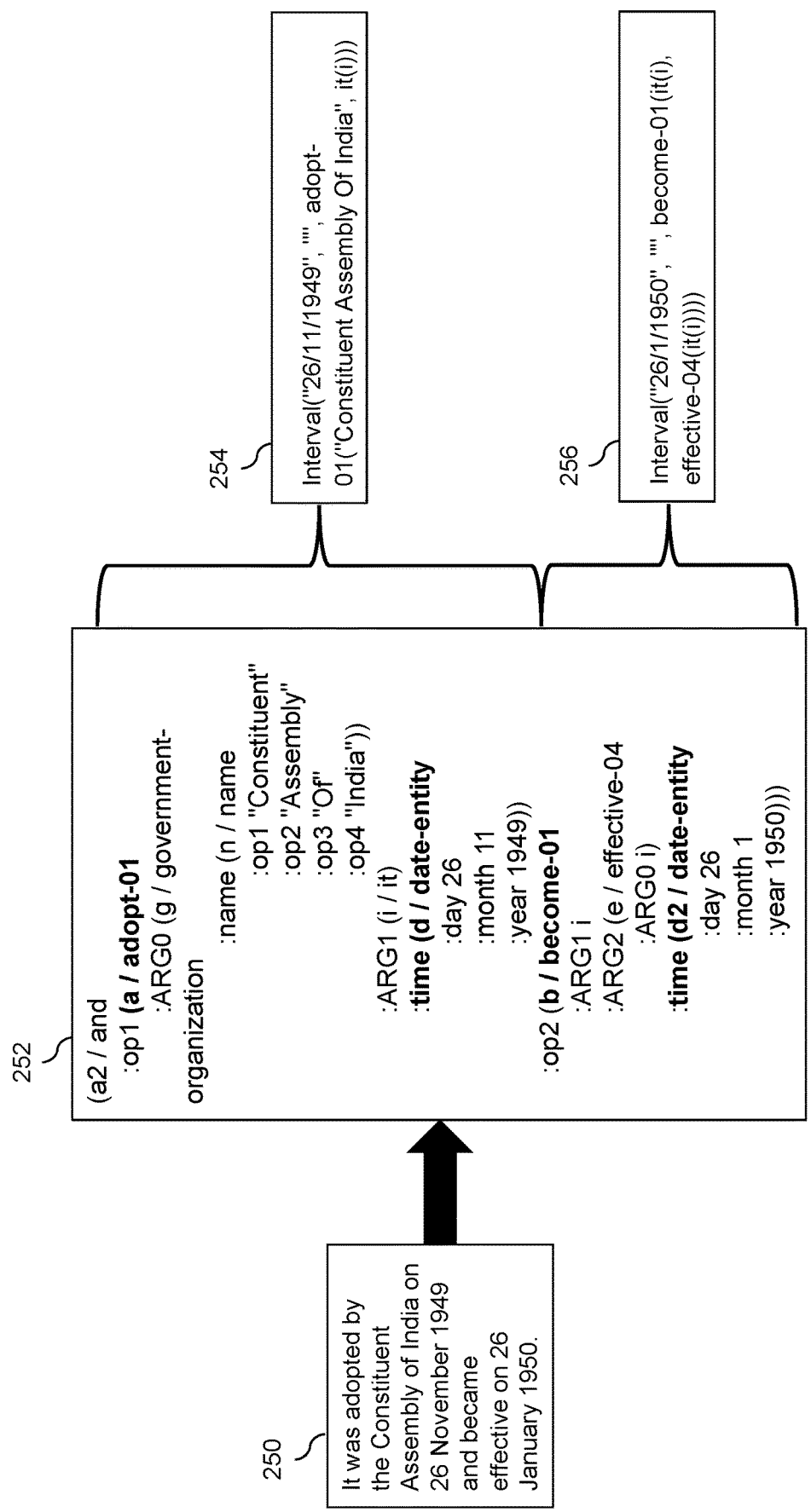
FIG. 2 is a diagram illustrating temporal fact logic generation, according to an example embodiment of the invention.

FIG. 2 is a diagram illustrating temporal fact logic generation, according to an example embodiment of the invention. By way of illustration, FIG. 2 depicts the process of generating temporal logical facts for a sentence containing one or more temporal facts. In the example depicted in FIG. 2, element 250 represents the input sentence, element 252 represents the AMR for input sentence 250, and elements 254 and 256 represent the logical representations of the temporal facts present in the question (of input sentence 250). Further details of generating temporal logical facts are described below.

As also detailed herein, one or more embodiments include ranking extracted and/or derived temporal information. Such an embodiment includes determining one or more query-relevant temporal intervals (e.g., in logic form, from among the extracted temporal information) with the highest score. More specifically, at least one embodiment can include creating the context ($Q_c$) for a given interval using question keywords and predicates identified in the intermediate logic. For each candidate entity and for each temporal fact identified, such an embodiment includes obtaining and/or generating a logical representation. For example, generating a logical representation can include starting at the node that is an instance of ":date-entity," proceeding to the parent of that node, and generating the logical representation considering this (parent) node as the predicate.

Also, with respect to each candidate entity, for each identified interval $I_j$, one or more embodiments include determining and/or gathering context $C(I_j)$ associated with the interval $I_j$, wherein $C(I_j)=(w_{j1}, w_{j2}, \ldots, w_{jm})$, wherein w represents a keyword, and $w_{ji}$ refers to the $i^{th}$ keyword relevant for the interval $I_j$. Accordingly, the ultimate score of interval $I_j$ can be determined as follows: Score($I_j$)=sim($Q_c$, $C(I_j)$). At least one embodiment can then include selecting the one or more intervals with the highest scores and/or each of one or more intervals with a score above a given threshold value. Additionally or alternatively, one or more embodiments include generating a list of candidate entities along with the highest score interval for each entity, and outputting such a list to an answer generation and/or temporal reasoning component/module for generating a final answer to the temporal query. Such an embodiment can also include, for example, ranking existing temporal information (for example, using the above-noted example, temporal information from the first part of query pertaining to Gandhi).

Accordingly, one or more embodiments include extracting query-specific temporal information from unstructured text data to bridge one or more knowledge gaps and answer one or more related temporal queries. As detailed herein, such an embodiment includes transforming an input query into an intermediate logic representation capturing one or more temporal constraints and identifying one or more knowledge gaps to drive the relevant temporal fact extraction. More specifically, at least one embodiment includes parsing an input query into a lambda calculus representation which captures one or more temporal constraints using AMR representation, and identifying one or more knowledge gaps in at least one given knowledge base by identifying the sub-expressions of the lambda query that lack required groundings. At least one embodiment can include mapping (answering) each sub-expression to a given knowledge base to determine if the given sub-expression is valid. If there are sub-expressions that cannot be mapped, such an embodiment can include considering such sub-expressions as one or more knowledge gaps and performing targeted extraction.

Such an embodiment also includes extracting one or more missing temporal clues (e.g., from the at least one given knowledge base) using a similar AMR-based logic representation of relevant text data (identified, e.g., using search/direct source document links from the knowledge base), and ranking the temporal clues and/or intervals using contextual information derived from the input question and contextual information surrounding the temporal clues extracted from text data.

As noted above, one or more embodiments include implementing lambda calculus, which can include at least one set of semantics and at least one set of temporal constructs. Such a set of semantics can include, for example, one or more constants which can include entities, numbers, and/or functions. Such functions can include, for example, functions that map entities to truth values (e.g., state(x)) and/or higher-order functions (e.g., count( ), argmax( ), argmin( ), max( ), min( )). Such a set of semantics can also include, for example, one or more logical connectors such as conjunction (∧), disjunction (∨), negation (¬), and implication (→), etc. Such a set of temporal constructs can include, for example, one or more functions for temporal events (e.g., interval(i1,event(x)), intervalOf(i2, date)).

Figure 3:
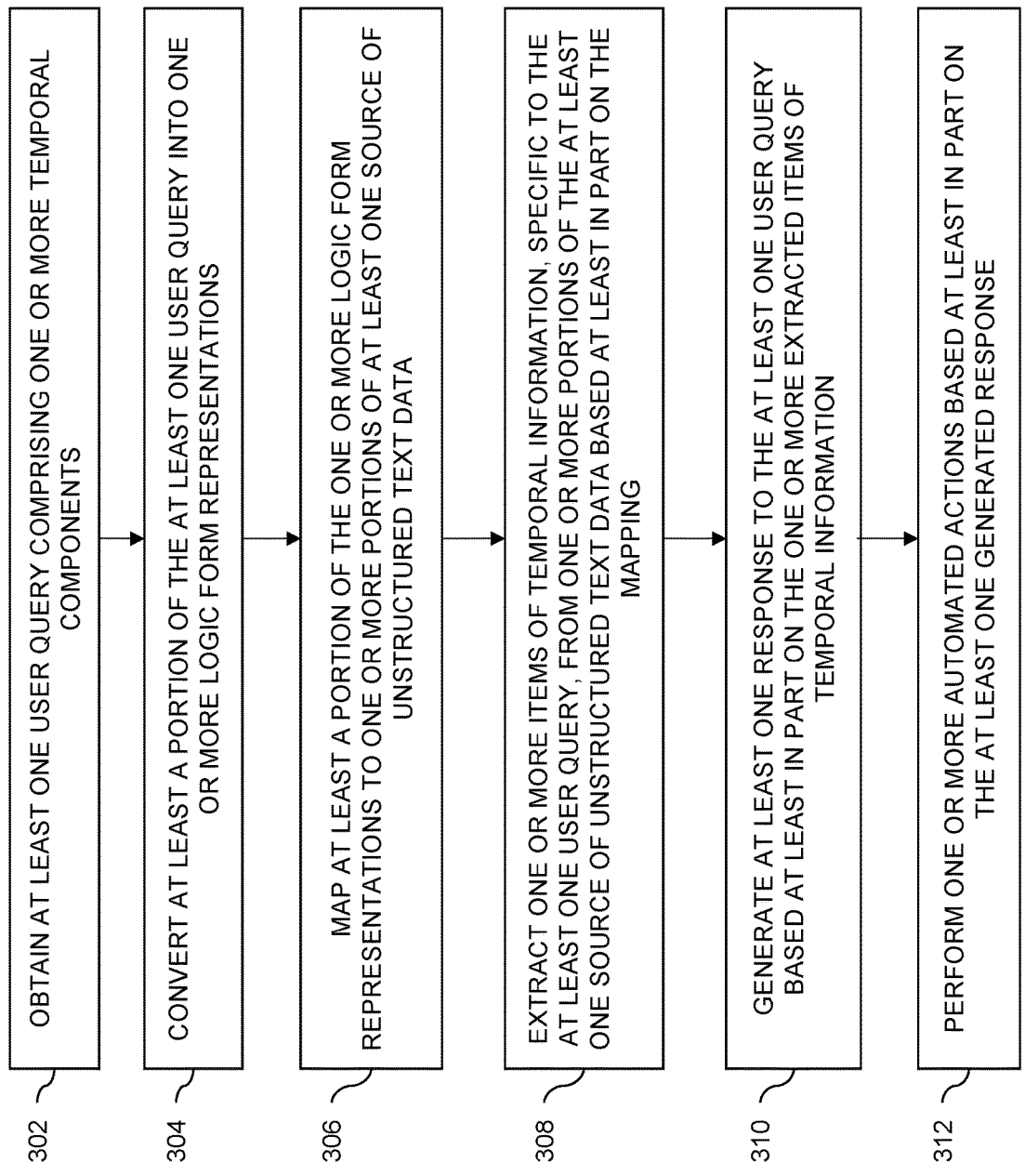
FIG. 3 is a flow diagram illustrating techniques according to an example embodiment of the invention.

FIG. 3 is a flow diagram illustrating techniques according to an embodiment of the present invention. Step 302 includes obtaining at least one user query comprising one or more temporal components.

Step 304 includes converting at least a portion of the at least one user query into one or more logic form representations. In at least one embodiment, converting includes parsing the at least one user query into an intermediate logic form which captures one or more temporal constraints. In such an embodiment, parsing the at least one user query into an intermediate logic form can include parsing the at least one user query into a lambda calculus representation, capturing the one or more temporal constraints using an abstract meaning representation.

Additionally or alternatively, converting can include converting the at least a portion of the at least one user query into one or more logic form representations by processing at least a portion of the at least one user query using one or more neural networks. In such an embodiment, and in connection with step 312 detailed below, performing the one or more automated actions can include training the one or more neural networks using the at least one user query and the at least one generated response.

Step 306 includes mapping at least a portion of the one or more logic form representations to one or more portions of at least one source of unstructured text data. In one or more embodiments, the at least one source of unstructured text data includes at least one query-relevant knowledge base. Additionally, at least one embodiment can include identifying one or more temporal-based knowledge gaps in the at least one source of unstructured text data based at least in part on the mapping of the at least a portion of the one or more logic form representations to the one or more portions of the at least one source of unstructured text data.

Step 308 includes extracting one or more items of temporal information, specific to the at least one user query, from one or more portions of the at least one source of unstructured text data based at least in part on the mapping.

Step 310 includes generating at least one response to the at least one user query based at least in part on the one or more extracted items of temporal information. In one or more embodiments, generating the at least one response to the at least one user query can be further based at least in part on contextual information derived from the at least one user query.

Step 312 includes performing one or more automated actions based at least in part on the at least one generated response. In at least one embodiment, performing the one or more automated actions includes training at least one artificial intelligence-based question-and-answer system using the at least one user query and the at least one generated response. Additionally or alternatively, performing the one or more automated actions can include outputting the at least one generated response to the user.

Further, in one or more embodiments, the techniques depicted in FIG. 3 can also include ranking at least a portion of the one or more extracted items of temporal information based at least in part on contextual information derived from the at least one user query. In such an embodiment, ranking the at least a portion of the one or more extracted items of temporal information can be further based at least in part on contextual information derived from the at least one source of unstructured text data.

Also, in at least one embodiment, software implementing the techniques depicted in FIG. 3 can be provided as a service in a cloud environment.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
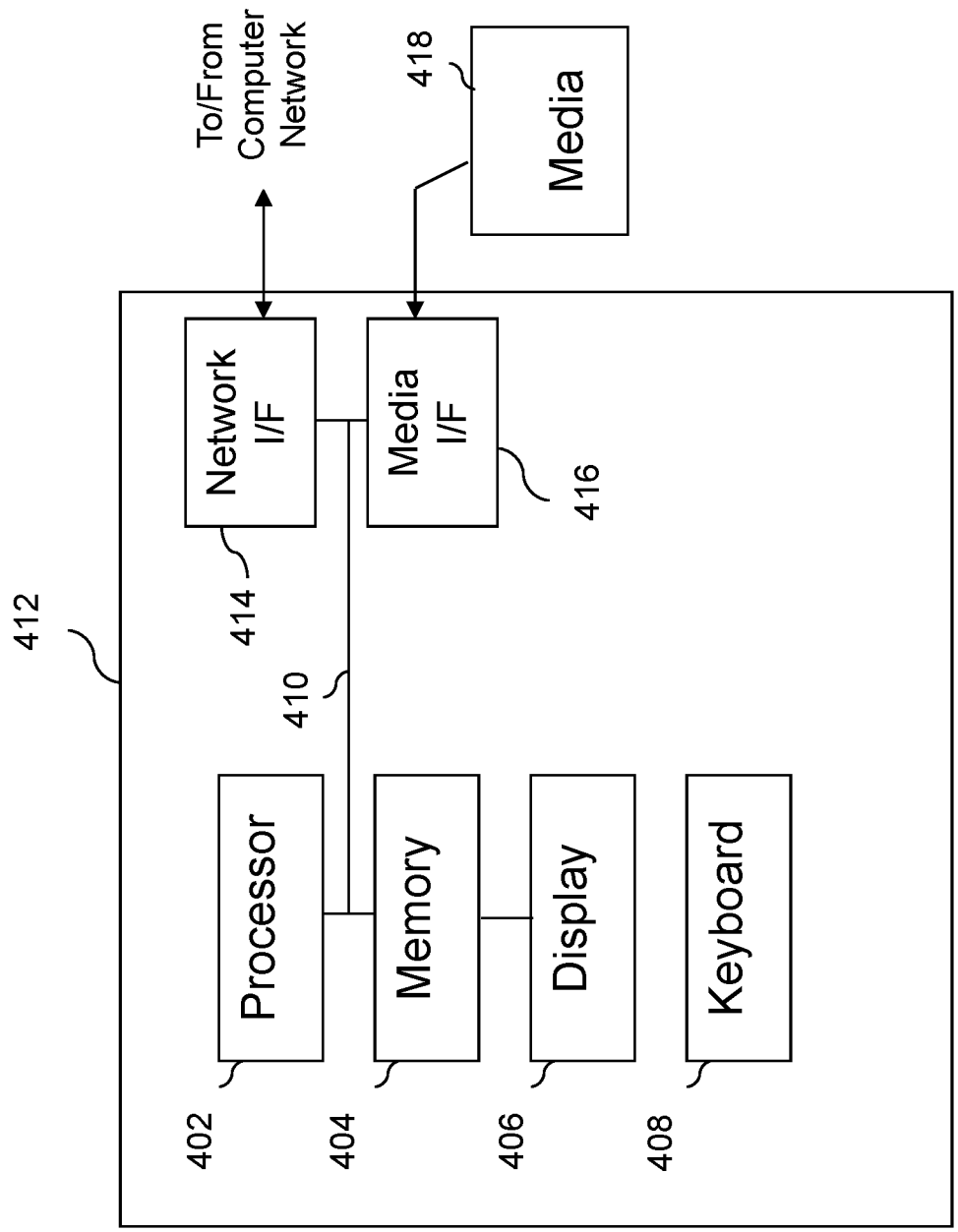
FIG. 4 is a system diagram of an example computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
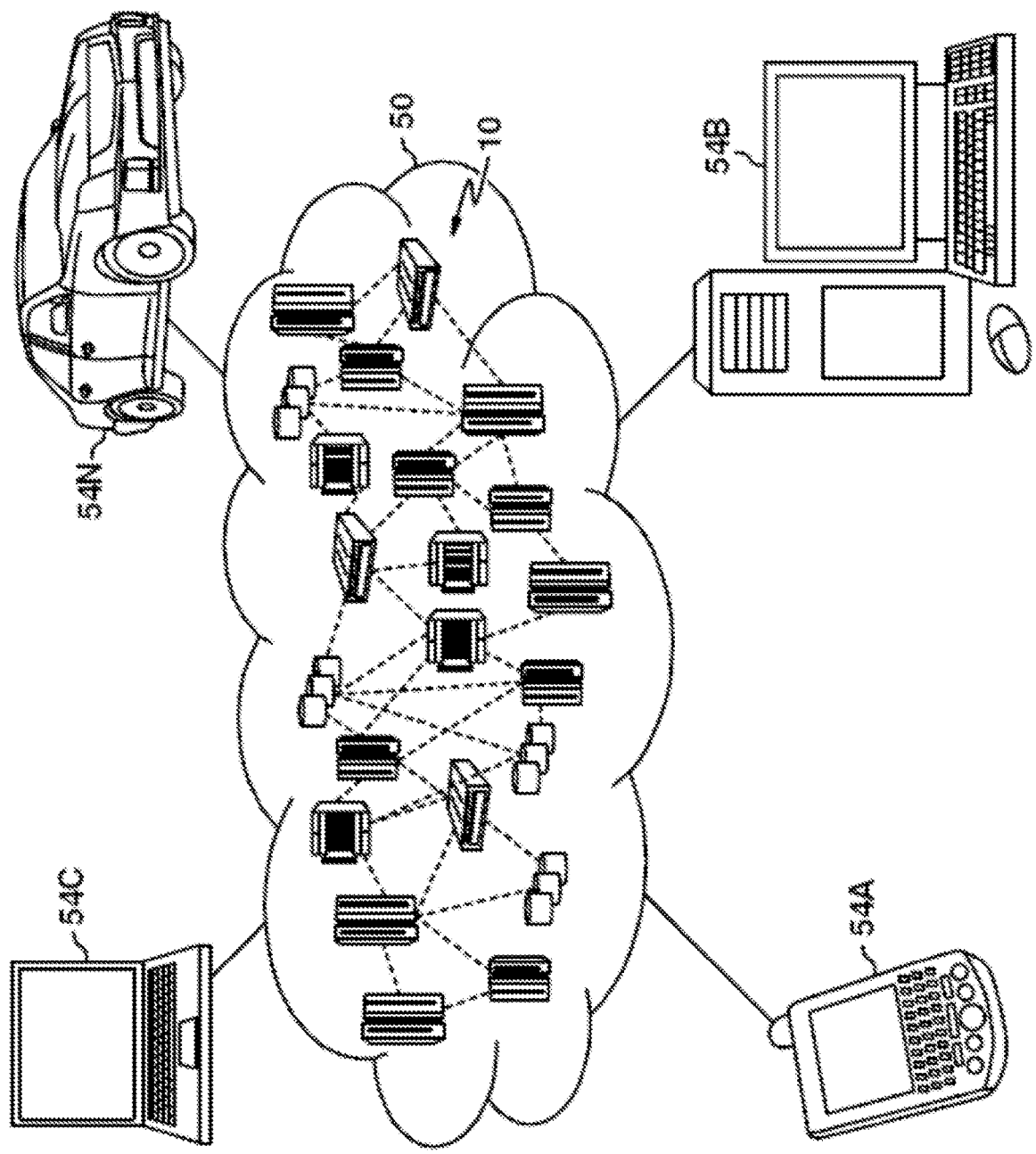
FIG. 5 depicts a cloud computing environment according to an example embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
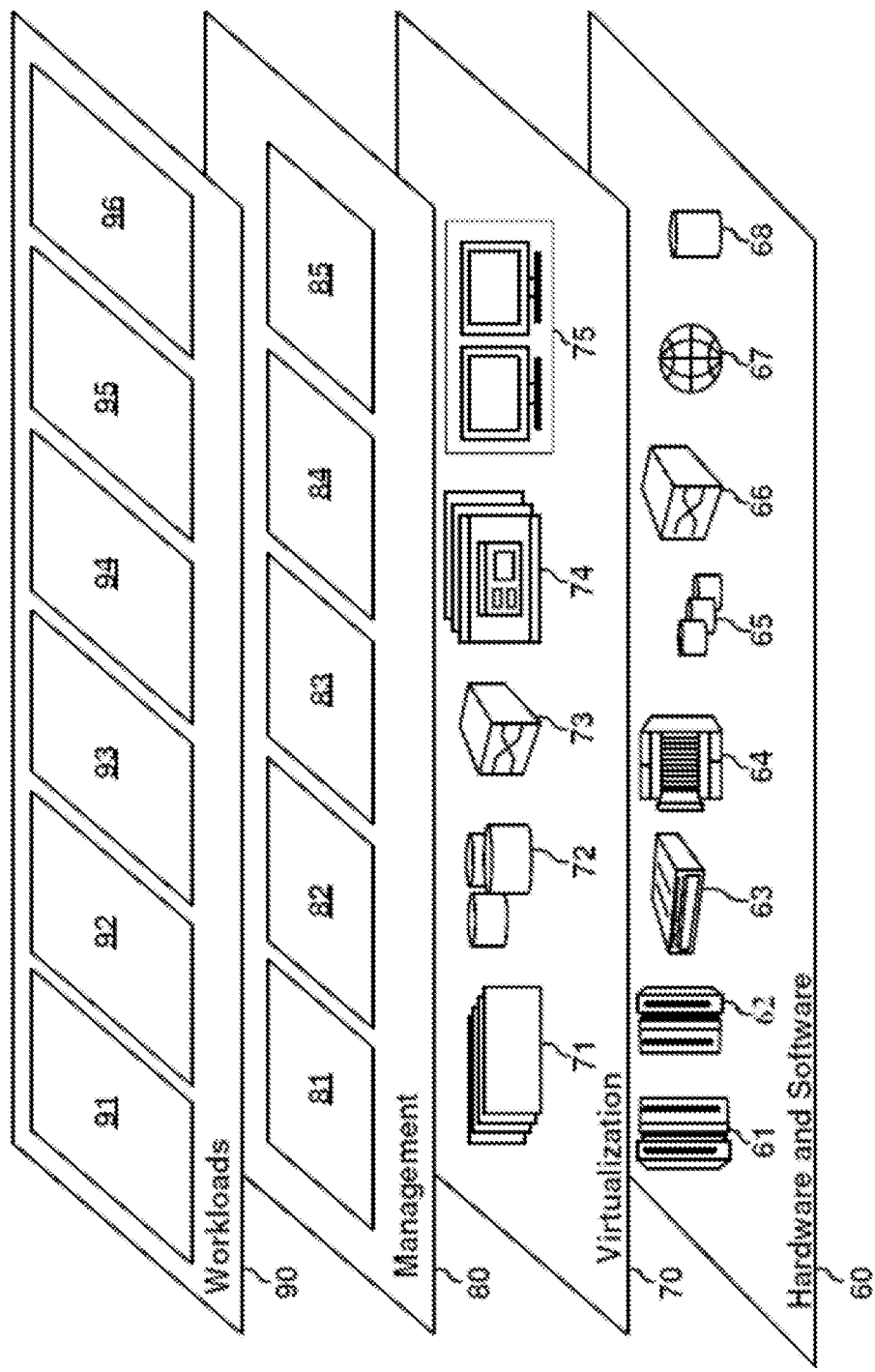
FIG. 6 depicts abstraction model layers according to an example embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and temporal information extraction 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, extracting query-related temporal information from unstructured text documents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

obtaining at least one user query;

converting at least a portion of the at least one user query into one or more logic form representations which capture one or more temporal constraints indicated in one or more portions of content within the at least one user query, wherein converting comprises processing the at least a portion of the at least one user query using one or more neural networks;

mapping at least a portion of the one or more logic form representations to unstructured text data stored in one or more portions of at least one source of unstructured text data, wherein the at least one source of unstructured text data comprises at least one query-relevant knowledge base;

extracting one or more items of temporal information, specific to the at least one user query, from one or more portions of the at least one source of unstructured text data based at least in part on the mapping;

generating at least one response to the at least one user query based at least in part on the one or more extracted items of temporal information;

wherein at least portions of results of the obtaining step, the converting step, the mapping step, the extracting step, and the generating step are stored in one or more knowledge bases; and performing one or more automated actions based at least in part on the at least one generated response, wherein performing the one or more automated actions comprises (i) transmitting the at least one generated response to at least one user corresponding to the at least one user query and (ii) automatically training at least a portion of the one or more neural networks using at least a portion of the at least one user query, comprising the at least a portion of the one or more logic form representations, and at least a portion of the at least one generated response;

wherein the method is carried out by at least one computing device.

2. The computer-implemented method of claim 1, wherein converting at least a portion of the at least one user query into an intermediate logic form comprises parsing the at least one user query into a lambda calculus representation, capturing the one or more temporal constraints using an abstract meaning representation.

3. The computer-implemented method of claim 1, wherein performing the one or more automated actions comprises training at least one artificial intelligence-based question-and-answer system using the at least one user query and the at least one generated response.

4. The computer-implemented method of claim 1, further comprising:

identifying one or more temporal-based knowledge gaps in the at least one source of unstructured text data based at least in part on the mapping of the at least a portion of the one or more logic form representations to the one or more portions of the at least one source of unstructured text data.

5. The computer-implemented method of claim 1, further comprising:

ranking at least a portion of the one or more extracted items of temporal information based at least in part on contextual information derived from the at least one user query.

6. The computer-implemented method of claim 5, wherein ranking the at least a portion of the one or more extracted items of temporal information is further based at least in part on contextual information derived from the at least one source of unstructured text data.

7. The computer-implemented method of claim 5, wherein generating the at least one response to the at least one user query is further based at least in part on the contextual information derived from the at least one user query.

8. The computer-implemented method of claim 1, wherein software implementing the method is provided as a service in a cloud environment.

9. A computer program product comprising a computer readable storage medium having program instructions embodied therewith, the program instructions executable by a computing device to cause the computing device to:

obtain at least one user query;

convert at least a portion of the at least one user query into one or more logic form representations which capture one or more temporal constraints indicated in one or more portions of content within the at least one user query, wherein converting comprises processing the at least a portion of the at least one user query using one or more neural networks;

map at least a portion of the one or more logic form representations to unstructured text data stored in one or more portions of at least one source of unstructured text data, wherein the at least one source of unstructured text data comprises at least one query-relevant knowledge base;

extract one or more items of temporal information, specific to the at least one user query, from one or more portions of the at least one source of unstructured text data based at least in part on the mapping;

generate at least one response to the at least one user query based at least in part on the one or more extracted items of temporal information;

wherein at least portions of results of the obtaining step, the converting step, the mapping step, the extracting step, and the generating step are stored in one or more knowledge bases; and perform one or more automated actions based at least in part on the at least one generated response, wherein performing the one or more automated actions comprises (i) transmitting the at least one generated response to at least one user corresponding to the at least one user query and (ii) automatically training at least a portion of the one or more neural networks using at least a portion of the at least one user query, comprising the at least a portion of the one or more logic form representations, and at least a portion of the at least one generated response.

10. The computer program product of claim 9, wherein converting at least a portion of the at least one user query into an intermediate logic form comprises parsing the at least one user query into a lambda calculus representation, capturing the one or more temporal constraints using an abstract meaning representation.

11. The computer program product of claim 9, wherein performing the one or more automated actions comprises training at least one artificial intelligence-based question-and-answer system using the at least one user query and the at least one generated response.

12. A system comprising:

a memory configured to store program instructions; and a processor operatively coupled to the memory to execute the program instructions to:

obtain at least one user query;

convert at least a portion of the at least one user query into one or more logic form representations which capture one or more temporal constraints indicated in one or more portions of content within the at least one user query, wherein converting comprises processing the at least a portion of the at least one user query using one or more neural networks;

map at least a portion of the one or more logic form representations to unstructured text data stored in one or more portions of at least one source of unstructured text data, wherein the at least one source of unstructured text data comprises at least one query-relevant knowledge base;

extract one or more items of temporal information, specific to the at least one user query, from one or more portions of the at least one source of unstructured text data based at least in part on the mapping;

generate at least one response to the at least one user query based at least in part on the one or more extracted items of temporal information;

wherein at least portions of results of the obtaining step, the converting step, the mapping step, the extracting step, and the generating step are stored in one or more knowledge bases; and perform one or more automated actions based at least in part on the at least one generated response, wherein performing the one or more automated actions comprises (i) transmitting the at least one generated response to at least one user corresponding to the at least one user query and (ii) automatically training at least a portion of the one or more neural networks using at least a portion of the at least one user query, comprising the at least a portion of the one or more logic form representations, and at least a portion of the at least one generated response.

13. The system of claim 12, wherein converting at least a portion of the at least one user query into an intermediate logic form comprises parsing the at least one user query into a lambda calculus representation, capturing the one or more temporal constraints using an abstract meaning representation.

14. The system of claim 12, wherein performing the one or more automated actions comprises training at least one artificial intelligence-based question-and-answer system using the at least one user query and the at least one generated response.

15. The system of claim 12, wherein the processor is operatively coupled to the memory to further execute the program instructions to:
rank at least a portion of the one or more extracted items of temporal information based at least in part on contextual information derived from the at least one user query.

16. The system of claim 15, wherein ranking the at least a portion of the one or more extracted items of temporal information is further based at least in part on contextual information derived from the at least one source of unstructured text data.

17. The system of claim 15, wherein generating the at least one response to the at least one user query is further based at least in part on the contextual information derived from the at least one user query.

18. The system of claim 12, wherein the processor is operatively coupled to the memory to further execute the program instructions to:
identify one or more temporal-based knowledge gaps in the at least one source of unstructured text data based at least in part on the mapping of the at least a portion of the one or more logic form representations to the one or more portions of the at least one source of unstructured text data.

19. The computer program product of claim 9, wherein the program instructions executable by the computing device further cause the computing device to:
rank at least a portion of the one or more extracted items of temporal information based at least in part on contextual information derived from the at least one user query.

20. The computer program product of claim 9, wherein the program instructions executable by the computing device further cause the computing device to:
identify one or more temporal-based knowledge gaps in the at least one source of unstructured text data based at least in part on the mapping of the at least a portion of the one or more logic form representations to the one or more portions of the at least one source of unstructured text data.

* * * * *